July 18, 1939.  W. F. BOLDT  2,166,793
BRAKE SHOE CLEARANCE TAKE-UP MEANS
Filed Nov. 17, 1937  2 Sheets-Sheet 1
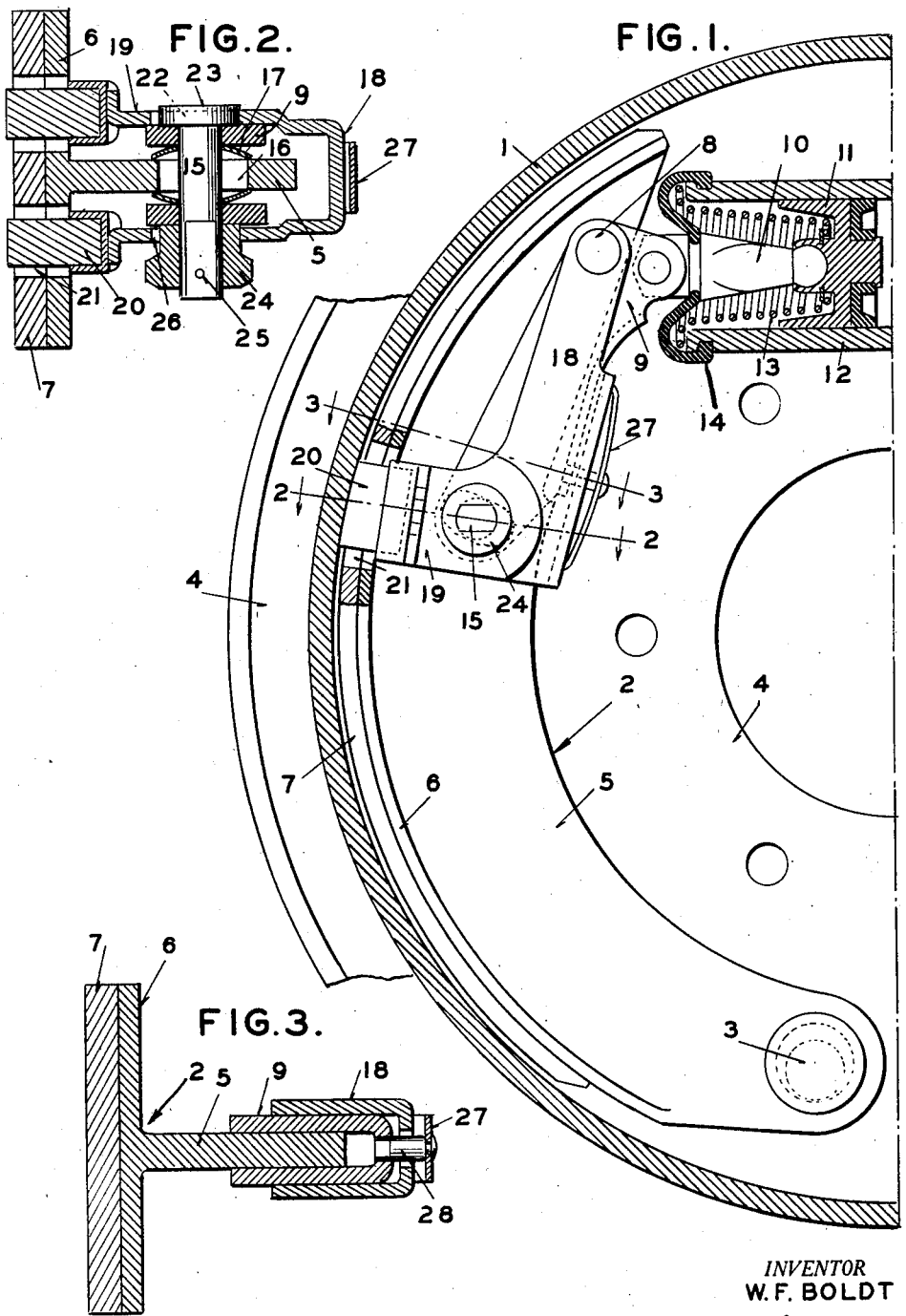
INVENTOR
W. F. BOLDT
ATTORNEY July 18, 1939.  W. F. BOLDT  2,166,793
BRAKE SHOE CLEARANCE TAKE-UP MEANS
Filed Nov. 17, 1937  2 Sheets-Sheet 2
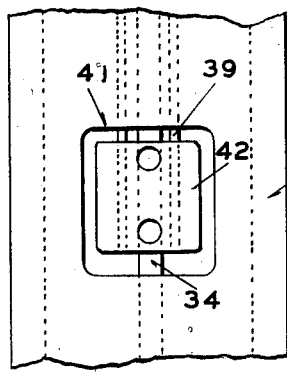
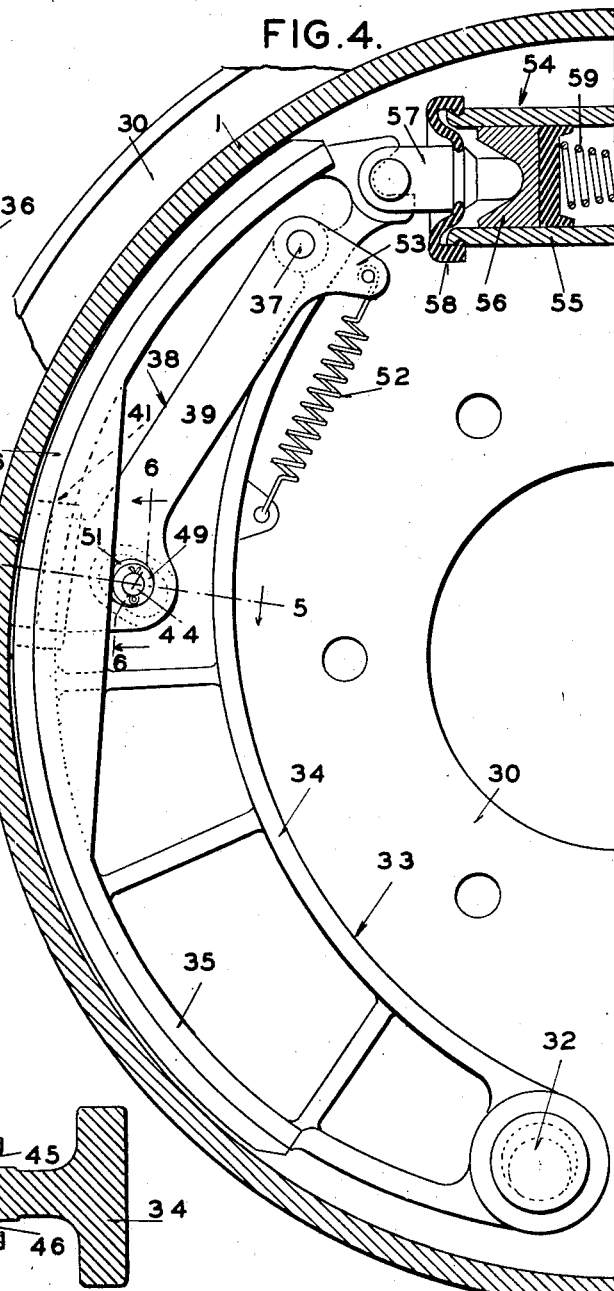
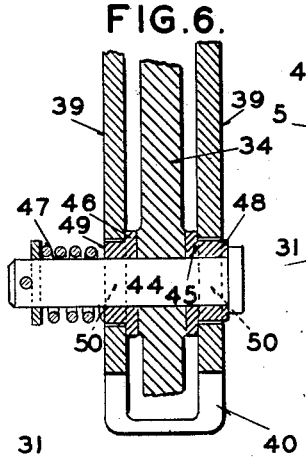
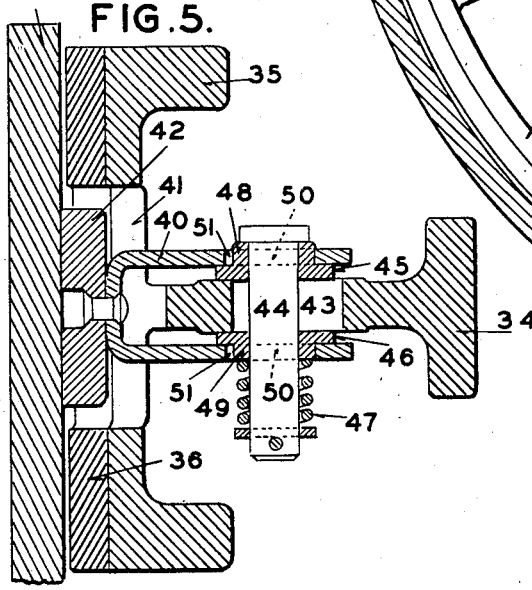
INVENTOR
W. F. BOLDT
BY
ATTORNEY Patented July 18, 1939

2,166,793

UNITED STATES PATENT OFFICE 2,166,793

BRAKE SHOE CLEARANCE TAKE-UP MEANS

Werner F. Boldt, Overland, Mo., assignor to Wagner Electric Corporation, St. Louis, Mo., a corporation of Delaware Application November 17, 1937, Serial No. 175,017

20 Claims. (Cl. 188—79.5)

My invention relates to brakes and more particularly to means for maintaining a predetermined clearance between the brake drum and brake shoe when the shoe is in its normal "off" position.

One of the objects of my invention is to provide a brake with means for automatically maintaining a predetermined "off" position clearance between the drum and brake shoe which is carried by the shoe independently of the brake supporting means and which employs a surface of the drum as a point of reference.

Another object of my invention is to provide an automatic means for maintaining a predetermined "off" position clearance for a brake shoe which will compensate for lining wear of the brake shoe and also be unaffected by any expansion and contraction of the drum as a result of braking action.

Still another object of my invention is to provide a clearance take-up means of the type referred to which permits a predetermined clearance to be set between the drum and shoe at the time of installation of the shoe and automatically maintains such clearance throughout the life of the shoe lining.

Still another object of my invention is to produce an automatic means for maintaining the "off" position clearance between a brake drum and a brake shoe that is so constructed as to inherently return the shoe to its "off" position when so permitted by the brake actuator and without the necessity of the usual brake shoe retracting spring or springs.

Still a further object of my invention is to provide a simple and inexpensive means for automatically maintaining a predetermined clearance between a brake drum and a brake shoe which can be easily installed in all existing brakes and which does not require any parts that must be machined with great accuracy.

Other and further objects will become apparent from the drawings which show two embodiments of my invention. In the drawings Figure 1 is a side view of a portion of a brake assembly, showing one form of my novel automatic brake shoe clearance take-up means embodied therein; Figure 2 is a cross-sectional view taken on the line 2—2 of Figure 1; Figure 3 is a cross-sectional view taken on the line 3—3 of Figure 1; Figure 4 is a side view of a brake assembly similar to Figure 1, showing a modified construction; Figure 5 is a cross-sectional view taken on the line 5—5 of Figure 4; Figure 6 is a cross-sectional view taken on the line 6—6 of Figure 4; and Figure 7 is a view of the lining carrying portion of the brake shoe of Figure 4, showing how the contact member extends through coinciding openings in the lining carrying flange and the lining of the brake shoe.

Referring in detail to Figures 1, 2, and 3, the reference character 1 indicates the usual brake drum of the brake assembly which is secured to the wheel of the vehicle and 2 indicates one of the brake shoes (the other being of similar construction) which is pivotally mounted within the drum on the adjustable pivot 3 and adapted to cooperate with the drum to produce a braking action. The support for the shoe consists of the usual backing plate 4 enclosing the open side of the drum and being secured to a fixed part of the vehicle, as for example, the axle housing. The brake shoe 2 is of T-section formation and comprises a web 5 and a lining carrying flange 6 upon which the lining 7 is secured for cooperative engagement with the inner surface of the drum when the brake shoe is actuated. The upper end of web 5 has pivotally mounted thereon by means of a pivot 8, an elongated member 9 of U-shaped construction, the legs of which are adapted to lie upon opposite sides of the shoe web. The upper end of member 9 is pivotally connected to piston rod 10 of the actuating piston 11 reciprocable in a cylinder 12 fixed to the backing plate. The piston 11 and cylinder 12 are parts of the well-known "wheel cylinder" which receives fluid under pressure from a remote source such as a pedal-actuated compressor (not shown). The pivot 8 of member 9 is positioned at one side of the line of force of piston 11 as shown in Figure 1, thus permitting the piston, when actuated, to apply a light turning force to member 9. A tension spring 13 interposed between the end of the cylinder and the piston applies a force to the piston in the actuating direction thereof, that is, toward the brake drum. A rubber boot 14 is also employed for preventing dirt and other foreign material from entering the cylinder.

The lower ends of the legs of the member 9 are offset in order to be spaced from the web 5 (see Figure 2) and these ends carry a pin 15 which extends through a slot 16 in web 5 of the shoe. This lower end of member 9 is adapted to be frictionally held to the shoe web by spring washers 17 carried by pin 15 and interposed in the space between each leg of member 9 and the adjacent web surface.

Also pivotally mounted on pivot 8 is a U-shaped lever 18 overlying member 9 and provided with portions or extensions 19 carrying drum contacting members or blocks 20 projecting through openings 21 in the lining carrying flange and the lining of the shoe. The legs of lever 18 are also offset in order to lie adjacent the offset ends of the legs of member 9 and are provided with openings 22, one of which is adapted to receive the integral head 23 of pin 19 and the other of which is adapted to receive the removable head 24 secured to pin 15 by cross-pin 25. The heads 23 and 24 are of equal diameter and of slightly less diameter than that of the openings 22, thus producing a clearance 26 which permits relative movement between member 9 and lever 18. This clearance is substantially equal to the clearance which is desired to be maintained between the lining of the shoe and the friction surface of the drum when the shoe is in "off" position. The "off" position clearance in present practice is generally somewhere between .010 and .015 of an inch but this clearance may be somewhat greater if desired since the automatic take-up means maintains a fixed clearance at all times. In order to normally maintain the clearance 26 in the position shown in Figure 2, a leaf spring 27 is carried by the back portion of lever 18 and the central portion of this leaf spring is connected to member 9 by means of pin 28 (Figure 3). The tension of this leaf spring in the position shown in Figure 1 is such as to prevent spring 13 from moving piston 11 to a position where the brake shoe is adapted to engage the drum. The leaf spring, however, has no effect in changing the position of pin 15 in opening 16 in the web of the shoe since member 9 is frictionally held to the web of the shoe and its position is not changed by the pressure of spring 13 which in the position shown holds the contact members 20 in engagement with the drum.

Referring to the operation of the above described mechanism, shoe 5 is initially mounted in the drum on pivot 3 and this pivot is so adjusted that the proper initial clearance is present between the heel of the shoe and the drum. Pin 15 is preferably so positioned in slot 16 that the contact members 20 will extend beyond the surface of lining 7 although such is not necessary. These contact members will be held in engagement with the drum surface by spring 13 since this spring is of sufficient strength to apply pressure to the shoe. The clearance 26 will be upon the outer side of the end 23 and sleeve 24 of pin 19 as shown in Figure 2. Initial actuation of piston 11 will transmit pressure to member 9 and since the contact members 20 are in contact with the drum, the motion of the brake shoe as a result of the pressure applied by the piston will cause relative movement between member 9 and lever 18. The amount of relative movement is determined by clearance 26. When this clearance is taken up, member 9 and lever 18 will move as a unit and at this time, if the shoe has not been brought into engagement with the drum, it can be by the swinging of lever 9 about pivot 8 and a resulting movement of pin 15 in slot 16. This will then properly set the mechanism and a correct working clearance will then be present which will be maintained under all conditions as will become apparent. When the fluid pressure in the wheel cylinder is released, leaf spring 27, which is somewhat stronger than the coil spring 13, will cause relative movement to take place between member 9 and lever 19. This relative movement will result in clearance 26 again assuming its position as shown in Figure 2 and since the contact members 20 are in constant engagement with the drum, the shoe will be pulled off the drum a distance substantially equal to clearance 26. The frictional grip between member 9 and web 5 of the brake shoe will be such as to normally prevent any relative movement between member 9 and the shoe. The shoe will be held in its "off" position by the pressure exerted by coil spring 13 of the wheel cylinder, the spring being of sufficient strength to prevent rattling of the shoe.

If during brake applied position of the shoe there is considerable brake lining wear, the automatic take-up mechanism will properly adjust itself so that the "off" position clearance of the shoe will always be maintained at a predetermined value. As the brake lining wears, the shoe moves out correspondingly in order to cause the same pressure on the drum. When the brake is on, the clearance 26 is on the side of pin 15 opposite that shown in Figure 2, that is, it is reversed. Therefore, the wear of the lining will have no effect in changing the relative movement between member 9 and lever 18. The movement of the brake shoe towards the drum to take care of the lining wear will thus result in the movement of member 9 in a counterclockwise direction about pivot 8, consequently, a movement relative to web 5 of the shoe. This will result in the new setting of pin 15 in slot 16 which will be maintained due to the frictional drag caused by the spring disks 17. When the pressure is released from piston 11 to permit the shoe to be released from the drum, spring 27 will again cause the shifting of lever 18 relative to member 9 sufficiently to move clearance 26 to the position shown in Figure 2, thus retracting the brake shoe from the drum and again positioning it at the predetermined distance from the drum as determined by clearance 26.

There may be conditions in operation of the vehicle upon which the brake is mounted wherein the brake is sparingly used, thus resulting in the contact members 20 wearing at a greater rate than the brake shoe lining. This condition would result in a gradual reduction of the clearance between the lining and the drum and if not compensated for, the shoe might eventually drag on the drum which, of course, would be very undesirable. Under the condition that the clearance between the lining and the drum is slightly less than clearance 26 between the pin and lever 18, the shoe when actuated will contact the drum before clearance 26 is taken up. Since now member 9 cannot take any reaction due to failure of clearance 26 to be taken up, no pressure can as yet be applied to the brake shoe by movement of piston 11. Therefore, the reaction of the shoe against the drum will be transmitted over member 9 and cause its lower end to move toward the drum until the clearance has been taken up and its reaction transmitted through lever 18 to contact members 20. This movement of member 9 is relative movement with respect to the web of the shoe and consequently pin 15 assumes a new position in slot 16, such new position being permitted by the slip of the frictional disks 17. The shoe clearance is now reset to its normal amount and when the shoe is released from the drum, the predetermined clearance will be present between the drum and the shoe. It is thus seen that the actuation of the shoe positively resets the mechanism so if there is a more rapid wear of the contact members than brake lining, such is compensated for by the mechanism. In the event pin 15 is so originally placed in slot 16 that the contact member does not extend beyond the lining surface, then the mechanism will be properly adjusted so the clearance is the right amount in the same manner as just described when the shoe is first actuated.

The mechanism is also unaffected in any way by expansion and contraction of the drum resulting from braking action. When the shoe is in engagement with the drum and the latter expands, the entire mechanism will move with the shoe as it follows the drum outwardly. There will be no relative movement between the shoe and any of the parts of the mechanism. If the drum is still hot and in an expanded condition when the shoe is retracted from the drum to its normal "off" position, the subsequent contracting of the drum will have no effect upon the clearance between the lining and the drum. This is readily apparent from the fact that the contact members 20 are in constant engagement with the drum surface and as the drum surface moves inwardly as a result of the cooling of the drum, the shoe and the mechanism will be moved back with the drum. There will be no relative movement between the parts and the shoe. The spring 27 will continue to maintain member 9 and lever 18 in the positions shown in the drawings. Because spring 27 is of greater strength than coil spring 13, the coil spring will be stretched sufficiently to permit the shoe and mechanism to move as a unit with the drum as it contracts, thus at all times maintaining the proper clearance.

From the foregoing description, it is evident that the mechanism is so designed that the "off" position of the shoe is always maintained regardless of the wear of the lining and the contact members under extreme conditions where the contact members may wear more rapidly than the lining. Under normal running conditions where the brakes are applied an average number of times per mile of vehicle travel, the wear of the lining and the wear of the contact members tend to balance each other and very little adjustment will take place. Since the mechanism takes care of any extreme wear of the contact members as well as the lining, it is possible for the contact members to be made of a relatively soft material such as, for example, low co-efficient brake lining or a very soft metal foil. Other materials may also be employed for the contact members when found desirable, such as carbon, molded and burned clay, hard brake lining, and so forth. The contact members should not, however, be of such material as to score the drum or cause an undesirable noise due to their constant engagement with the drum.

The automatic adjusting mechanism permits the brake shoes to be properly set at the time of their installation and does not require any more adjustments during the entire life of the lining. There is no possibility of the shoes being set too close to the drum so they drag and overheat the brake as is possible where the adjustment is made manually by movement of a fixed stop. There is no necessity for any special machining of the parts with possibly the exception of holes 22 in lever 18 and the ends 23 of pin 15. These, of course, do not need to be extremely accurate. The mechanism is also such that expansion and contraction of the brake drum due to braking action has no effect upon the mechanism since it is carried entirely by the shoe and is free to follow the drum outwardly with the shoe or be moved back with the shoe as the drum contacts.

This is an important feature as the full pedal stroke on the compensator or master cylinder (not shown) is always available and it is impossible to have what is called "pedal fadeout" which may be present when the clearance adjustment is manual and no provision is made to compensate for drum expansion during braking action. The mechanism also permits the usual retractile spring between the shoes to be eliminated, thus giving more space in the drum and permitting the wheel cylinder to be positioned at a greater distance from the drum where the heat will less likely cause any "gassing" of the liquid employed as a force transmitting medium.

Referring to Figures 4, 5, 6, and 7, there is shown a modified construction in which the actuating force of the piston of the fluid motor acts directly upon the end of the shoe in the usual manner instead of through the automatic adjusting mechanism. The backing plate 30 which encloses the drum 31 has pivotally mounted thereon by means of the adjustable pivot 32, the brake shoe 33. This shoe comprises a web 34 and a lining carrying portion 35 upon which is secured the brake lining 36. At the upper end of web 34 there is pivotally mounted on a pin 37, a lever 38, this lever comprising two portions 39 lying upon opposite sides of the web and connected together by a U-shaped portion 40 which lies in an opening 41 in the lining, the lining carrying portion and a portion of the web of the shoe (see Figure 5). The U-shaped portion has mounted thereon a drum contacting member 42 of suitable material preferably harder than the brake lining, as for example, aluminum foil, molded and burned clay, or hard carbon.

The web of the shoe adjacent opening 41 is formed with a slot 43 in which is positioned a pin 44 frictionally clamped in the slot by means of the washers 45 and 46 and the spring 47. The washers 45 and 46 are formed with bosses 48 and 49 which are adapted to lie in oversized openings 50 in the lower ends of the portions 39 of the lever. The difference between the diameters of bosses 48 and 49 and the openings 50 is substantially equal to the clearance which is desired to be maintained between the shoe lining and the drum when the shoe is in its normal "off" position. This clearance is best shown in Figure 5 and is indicated by the reference character 51.

The contact member 42 carried by the U portion of the lever is normally held in contact with the drum surface by means of a spring 52 connected at one end to the shoe web and at the other end to ears 53 on the portions 39. This spring in the normal "off" position of the shoe also maintains lever 38 in such position that the clearance 51 between bosses 47 and 49 is in the position shown in Figure 5. The strength of spring 52 is such that it will not move pin 44 in slot 43 against the frictional grip of washers 45 and 46.

The shoe is actuated into engagement with the drum by means of the fluid motor 54 which comprises a cylinder 55, a piston 56, and a piston rod 57 having associated therewith and the cylinder, a dust excluding boot 58. A spring 59 in the cylinder applies a light force to the piston to maintain the shoe in the position where the contact member 42 will engage the drum. This spring 59, however, is not strong enough to overcome the action of spring 52 in maintaining the clearance 51 on the side of the bosses adjacent the drum.

In operation the shoe is initially mounted in the drum and the clearance between the heel of the shoe and the drum properly determined by adjusting anchor pin 32. The pin 44 is so positioned in slot 43 that the contact member 42 will extend beyond the surface of the lining a distance at least equal to or greater than the shoe clearance desired. Upon the first actuation of piston 56 to apply the brake to the drum, movement of the shoe toward the drum will result in relative movement between lever 38 and the shoe. The clearance 51 will consequently be moved from one side of the bosses 48 and 49 to the opposite side and if at this time the lining of the shoe has not as yet been brought into engagement with the drum, relative movement between the lever and the shoe will continue, thereby resulting in pin 44 being moved to the right in slot 43. When the lining is in engagement with the drum, the pin will be properly adjusted so the proper clearance between the lining and the drum will be present when the brake is moved to its "off" position. Upon releasing the brake by releasing the fluid pressure in the fluid motor, spring 52 will become active to pull this shoe off the drum, the contact member 42 under these conditions acting as the fulcrum point. Spring 52, however, will only move the shoe away from the drum an amount equal to the clearance 51 since, as already pointed out, this spring 52 is not strong enough to shift pin 44 in slot 43. Therefore, the clearance between the lining and the drum will be substantially the same as the clearance between the openings 50 and the bosses 48 and 49. The shoe is held from moving farther away from the drum than its "off" position by the spring 59 which is weaker than spring 52.

When the shoe is again brought into engagement with the drum, there will be no movement of pin 44, only a shifting of the clearance 51 from one side of the bosses 48 and 49 to the opposite side. In the event the lining wears during shoe engagement, the shoe will be moved out farther toward the drum and consequently there will be relative movement between lever 38 and the shoe of the web as the clearance 51 has already been taken up. This will result in the shifting movement of pin 44 to the right in slot 43, as viewed in Figure 5, thus resetting the mechanism for the proper clearance when the shoe is released.

If during braking action the drum becomes hot and expands, the entire shoe will move out with the drum and there will be no relative movement between lever 38 and the shoe web. When the shoe is released, the proper clearance between the lining and the drum will again be present and this will not be affected as the drum contracts since the shoe will be pushed back with the drum through the contact member 42. This is permitted because spring 59 in the fluid motor is of less strength than spring 52 which normally maintains lever 38 in the position where the clearance 51 is on the side adjacent the shoe.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus comprising cooperating friction elements one of which is rotatable, means tending to maintain predetermined clearance between said elements, said means comprising a part continuously in contact with the rotatable element and carried by the other element, and means associated with said part and the other element permitting predetermined relative movement therebetween and also permitting automatic adjustment therebetween as a result of wear of one of the friction elements.

2. In braking mechanism, a support, a drum, a brake friction element carried by the support and adapted to cooperate with the drum, means for actuating said element, means tending to move said element from contact with the drum friction surface and to a predetermined distance therefrom, said means having a part at all times in contact with the drum, and means associated with said part and the friction element permitting predetermined relative movement therebetween and also permitting additional relative movement therebetween as a result of wear of the surface of said friction element.

3. In braking mechanism, a support, a drum, a brake friction element carried by the support and adapted to cooperate with the drum, means for actuating the friction element into engagement with the drum, means mounted on said element for automatically maintaining a predetermined clearance between the drum and friction element when the actuating means is released, said means comprising a part continuously in contact with the surface of the drum, means associated with said part and the friction element permitting predetermined relative movement therebetween during actuation of said element, and frictional means permitting said part and element to be adjusted relatively to each other as a result of wear of the surface of said friction element.

4. In braking mechanism, a support, a drum, a brake friction element carried by the support and adapted to cooperate with the drum, means for actuating the friction element, means mounted on said element and comprising a part continuously in contact with a surface of the drum for moving the element a predetermined distance from the drum when the actuating means is released, and means operable by the actuating means during the engaging of the friction element with the drum for compensating for wear of said part which is continuously in contact with a surface of the drum.

5. In braking mechanism, a support, a drum, a brake friction element carried by the support and adapted to cooperate with the drum, means for actuating the element, means independent of the support and mounted on the friction element for returning the friction element to a position where it will be a predetermined distance from the drum friction surface when the actuating means is released, said means comprising an element continuously in contact with the surface of the drum, means associated with said part and the friction element permitting predetermined free relative movement therebetween during actuation of said element and also permitting additional relative movement therebetween as the surface of said friction element wears, and biasing means for the element.

6. In braking mechanism, a support, a drum, a brake shoe carried by the support and adapted to cooperate with the drum, means for actuating the shoe, means independent of the support and mounted on the shoe for automatically maintaining a predetermined clearance between the drum friction surface and the cooperating shoe friction surface when the actuating means is released and notwithstanding wear of the shoe friction surface, the drum friction surface or expansion and contraction of the drum resulting from braking action, said means comprising an element continuously in contact with a surface of the drum, means associated with said element and the brake shoe permitting predetermined relative movement therebetween during actuation of said shoe, and frictional means permitting said element and shoe to be adjusted relatively to each other as a result of wear of the brake shoe.

7. In braking mechanism, a support, a drum, a brake shoe carried by the support and adapted to cooperate with the drum, means for actuating the shoe, means independent of the support and mounted on the shoe for returning said shoe to a position where it will be a predetermined distance from the drum friction surface, said means comprising an element continuously in contact with a surface of the drum, means associated with said element and the brake shoe permitting predetermined relative movement therebetween during actuation of the shoe and also permitting automatic adjustment of the limits of said relative movement as the brake shoe wears, and means for normally maintaining said shoe in said position and the element in engagement with the drum.

8. In braking mechanism, a support, a drum, a brake shoe carried on the support and adapted to cooperate with the drum, means for actuating the shoe, means independent of the support and mounted on the shoe for automatically maintaining a predetermined clearance between the drum friction surface and the cooperating shoe friction surface when the actuating means is released, said means comprising an element continuously in contact with a surface of the drum, a member frictionally engaging the shoe and adapted to be moved relative to the shoe by a predetermined pressure, and means permitting said element to have a predetermined relative movement with respect to the member.

9. In braking mechanism, a support, a drum, a brake shoe carried on the support and adapted to cooperate with the drum, means for actuating the shoe, means independent of the support and mounted on the shoe for automatically maintaining a predetermined clearance between the drum friction surface and the cooperating shoe friction surface when the actuating means is released, said means comprising an element continuously in contact with a surface of the drum, a member frictionally engaging the shoe and adapted to be moved relative to the shoe by a predetermined pressure, means permitting said element to have a predetermined relative movement with respect to the member, and means for so normally biasing the element with respect to said member that said relative movement will occur during the movement of the shoe toward the drum from its "off" position.

10. In braking mechanism, a support, a drum, a brake friction element carried on the support and adapted to cooperate with the drum, means independent of the support and mounted on the friction element for automatically maintaining a predetermined clearance between the drum friction surface and the cooperating friction element when the friction element is permitted to be disengaged from the drum, said means comprising an element continuously in contact with a surface of the drum, a member frictionally engaging the friction element and adapted to be moved relative to the friction element by predetermined pressure, means permitting said element to have a predetermined relative movement with respect to the member, and actuating means connected to said member for actuating the friction element and for applying pressure to said member.

11. In braking mechanism, a support, a drum, a brake shoe carried on the support and adapted to cooperate with the drum, means for actuating the shoe, means independent of the support and mounted on the shoe for automatically maintaining a predetermined clearance between the drum friction surface and the cooperating shoe friction surface when the actuating means is released, said means comprising an element continuously in contact with a surface of the drum, a member frictionally engaging the shoe and movable relative thereto by a predetermined pressure, cooperating means between the element and member providing relative movement of an amount substantially equal to the desired predetermined clearance, spring means for normally biasing the element to a position where it is at one limit of its relative movement with respect to the member, and other spring means acting on the shoe and of less strength than the first named spring means.

12. In braking mechanism, a support, a drum, a brake friction element carried on the support and adapted to cooperate with the drum, means for actuating the friction element, and means independent of the support and mounted on the friction element for automatically maintaining a predetermined clearance between the drum friction surface and the cooperating friction element when the actuating means is released, said means comprising a lever pivoted on the element and continuously in contact with the surface of the drum, means associated with the lever and the element permitting free predetermined relative movement therebetween during actuation of the element and including frictional means for permitting adjustment of the lever relatively to the friction element as a result of wear of said friction element and without affecting the predetermined relative movement.

13. In braking mechanism, a support, a drum, a brake shoe carried by the support and adapted to cooperate with the drum, means for actuating the shoe, means independent of the support and mounted on the shoe tending to move said shoe away from the drum and to a predetermined distance from the drum friction surface when the actuating means is released, said means comprising a lever pivoted on the shoe and provided with a part continuously in contact with a surface of the drum, means associated with said lever and the brake shoe permitting predetermined relative movement therebetween during actuation of the latter and also permitting adjustment of the limits of said relative movement as the brake shoe wears, and spring means for holding said shoe in a position causing said part of the lever to be in engagement with the drum.

14. In braking mechanism, a support, a drum, a brake shoe carried on the support and adapted to cooperate with the drum, means for actuating the shoe, means independent of the support for automatically maintaining a predetermined clearance between the drum friction surface and the cooperating shoe friction surface when the actuating means is released notwithstanding wear of the shoe friction surface or expansion and contraction of the drum resulting from braking action, said means comprising a lever pivoted to the shoe and having a part continuously in contact with a surface of the drum, a member frictionally engaging with the shoe and movable relative thereto by a predetermined pressure, means permitting said lever and member to have a predetermined lost motion corresponding to the desired clearance between the drum and shoe, and spring means for normally so maintaining the position of the lost motion between said lever and member that it will be taken up by movement of the shoe from its "off" position toward the drum.

15. In braking mechanism, a support, a drum, a brake shoe carried on the support and adapted to cooperate with the drum, means for actuating the shoe, means independent of the support for automatically maintaining a predetermined clearance between the drum friction surface and the cooperating shoe friction surface when the actuating means is released and notwithstanding wear of the shoe friction surface or expansion and contraction of the drum resulting from braking action, said means comprising a lever pivoted to the shoe and having a part continuously in contact with a surface of the drum, a member frictionally engaging the shoe and movable relative thereto by a predetermined pressure, means permitting said lever and member to have a predetermined lost motion corresponding to the desired clearance between the drum and shoe, spring means for normally so maintaining the position of the lost motion between said lever and member that it will be taken up by movement of the shoe toward the drum, and other spring means for holding said shoe in its normal "off" position where the part of the lever will be in contact with the drum surface.

16. In braking mechanism, a support, a drum, a brake shoe carried on the support and adapted to cooperate with the drum, a lever pivoted to the shoe and having a part continuously in contact with the drum, a member pivoted to the shoe, actuating means for the shoe cooperating with the pivoted member and acting on the member by a moment of force, means connecting the lever and member together and permitting predetermined relative movement therebetween, means causing said member to frictionally engage the shoe, and spring means cooperating with the lever for causing said lever to move relative to the member and the shoe to move away from the drum when the shoe is so permitted by the actuating means.

17. In braking mechanism, a support, a drum, a brake shoe carried on the support and adapted to cooperate with the drum, a lever pivoted to the shoe and having a part continuously in contact with the drum, a member pivoted to the shoe coaxially with the lever, actuating means for the shoe cooperating with the pivoted member and acting on the member by a moment of force, means connecting the lever and member together and permitting predetermined relative movement therebetween, means causing said member to frictionally engage the shoe at a point spaced from the pivot, spring means cooperating with the lever for causing said lever to move relative to the member and for also causing the shoe to move away from the drum when the shoe is so permitted by the actuating means, and other spring means for holding the shoe in its "off" position and the lever part in contact with the drum surface.

18. In braking mechanism, a support, a drum, a brake shoe carried on the support and adapted to cooperate with the drum, means for actuating the shoe, and biasing means comprising a lost motion mechanism and a spring carried solely by the shoe as a unit and independent of the support and cooperating with the drum for disengaging the shoe from the drum and moving it to "off" position when the actuating means is released.

19. In braking mechanism, a support, a drum, a brake shoe carried on the support and adapted to cooperate with the drum, means for actuating the shoe, means carried by the shoe and independent of the support for disengaging the shoe from the drum and moving it to "off" position when the actuating means is released, said means comprising an element having predetermined relative movement with respect to the shoe and adapted to engage a surface of the drum, and spring means connected to the shoe and element and acting to move the shoe away from the drum and relatively to the element when said shoe is in engagement with the drum.

20. In braking mechanism, a support, a drum, a brake shoe carried on the support and adapted to cooperate with the drum, means for actuating the shoe, and spring-operated lever means carried by the shoe only and employing a surface of the drum as a point of engagement for disengaging the shoe from the drum and moving it to "off" position when the actuating means is released.

WERNER F. BOLDT.